United States Patent [19]

Sugiura et al.

[11] 4,341,459
[45] Jul. 27, 1982

[54] SCANNING PROJECTION APPARATUS

[75] Inventors: Muneharu Sugiura, Tokyo; Kazuo Minoura, Yokohama; Setsuo Minami, Kawasaki, all of Japan

[73] Assignee: Canon Kabushiki Kaisha, Tokyo, Japan

[21] Appl. No.: 92,070

[22] Filed: Nov. 7, 1979

[30] Foreign Application Priority Data

Nov. 14, 1978 [JP] Japan .................... 53/140112

[51] Int. Cl.³ .................... G03G 15/28; G03B 27/34
[52] U.S. Cl. ........................ 355/8; 355/51; 355/60
[58] Field of Search ............ 355/3 R, 8, 11, 51, 355/65, 66, 60

[56] References Cited

U.S. PATENT DOCUMENTS

| | | | |
|---|---|---|---|
| 3,537,373 | 11/1970 | Land | 354/187 X |
| 3,576,368 | 4/1971 | Goetz et al. | 355/65 X |
| 4,125,323 | 11/1978 | Ikeda et al. | 355/8 |
| 4,158,497 | 6/1979 | Suzuki et al. | 355/8 |
| 4,170,412 | 10/1979 | Grace et al. | 355/11 X |
| 4,213,690 | 7/1980 | Sugiura et al. | 355/8 |

Primary Examiner—Fred L. Braun
Attorney, Agent, or Firm—Fitzpatrick, Cella, Harper & Scinto

[57] ABSTRACT

A scanning projection apparatus including a first imaging optical system, a first plane provided on one side of the optical system, a deflector for deflecting a light beam emerging from the first plane and passing through the first imaging optical system, a second imaging optical system for receiving the light beam deflected by the deflector and a second plane provided at the focusing position of the light beam by the second imaging optical system, whereby the first plane is scanned with a slit of a width ΔS, using the deflector, and the thus obtained slit image of the first plane is projected in succession on a determined position in said second plane, wherein the slit width ΔS is selected to satisfy a relation ΔS<1/Rp in which Rp represents the resolving power of the image on the second plane, and wherein the first or second imaging optical system includes elements for correcting the image magnification in the longitudinal direction of the slit.

10 Claims, 8 Drawing Figures

SCANNING PROJECTION APPARATUS

BACKGROUND OF THE INVENTION

1. Field of the Invention

The present invention relates to a projection apparatus for forming a distortion-free image of a flat plane to be scanned by means of a light deflector such as a continuously rotating mirror for example a polygonal mirror or a reciprocatingly rotating mirror for example a Galvano mirror (hereinafter collectively called rotary mirror).

2. Description of the Prior Art

There are already proposed various apparatus for projecting the image of a flat plane to be scanned onto a determined light-receiving plane by means of a light deflector such as a rotary mirror. One example of such apparatus, disclosed in the U.S. Pat. No. 3,576,368, comprises two imaging optical system and a rotary mirror provided therebetween for scanning the parallel beam. FIG. 1 shows an example of the projection apparatus utilizing such scanning system, wherein the light beam emerging from a plane 1 to be scanned is converted into a parallel beam by means of a first imaging lens 2 having a focal plane thereof on said scanned plane 1, and said parallel beam is deflected by a rotary mirror 3 and focused by a second imaging lens 4 onto a focal plane 5 thereof, so that the position P on said scanned plane 1 corresponding to a determined position P' on said plane 5 displaces with the rotation of the rotary mirror 3.

In such projection optical system, although it is possible to compensate the change in the optical path length between the scanned plane 1 and the projection plane 5 resulting from the rotation of the rotary mirror 3, there will result a change in the imaging magnification in the scanning direction (i.e. in the paper plane) and also in a direction perpendicular to said scanning direction (i.e. perpendicular to the paper plane) along with the change of the scanned position P on the scanned plane 1. Besides the rate of said change in the imaging magnification in the scanning direction is different from that in the perpendicular direction. For this reason the image formed on the focal plane 5 becomes distorted.

Also the U.S. Pat. No. 3,537,373 discloses another apparatus for scanning a flat plane 1 with a rotary mirror in which the first imaging lens 2 in FIG. 1 is eliminated and in which two lens elements in the remaining second imaging lens 4 are displaced along the optical axis thereof to compensate the change in the optical path length between the scanned plane and the focal plane 5 and to maintain the conjugate relationship between said two planes. Stated differently the apparatus disclosed in said U.S. Pat. No. 3,537,373 maintains the imaging magnification in the scanning direction of the scanned plane while maintaining the conjugate relationship between said scanned plane 1 and the focal plane 5.

SUMMARY OF THE INVENTION

The object of the present invention is to provide a projection apparatus capable of compensating the effect of a light deflector such as a rotary mirror on the imaging magnification different in the scanning direction thereof and in the perpendicular direction thereof.

Another object of the present invention is to provide a compact projection apparatus.

In the projection apparatus of the present invention the above-mentioned objects can be achieved by selecting a satisfactorily small slit width for rendering the change in the imaging magnification in the scanning direction negligibly small, and providing an optical system for compensating the change in the imaging magnification in the longitudinal slit direction resulting from the deflecting action of the deflector. Also in the projection apparatus of the present invention the light beam deflected by the deflector is rendered parallel for enabling a compact projection apparatus.

More specifically the above-mentioned objects of the present invention are achieved by a projection apparatus comprising a first imaging optical system, a first plane to be scanned and positioned at the focal plane of said optical system, a deflector for deflecting the light beam emerging from said first plane and rendered parallel by said first imaging optical system, a second imaging optical system for receiving the parallel beam deflected by said deflector, and a second plane provided at the focus position of said parallel beam by said second imaging optical system, whereby said first plane being scanned with a slit of a width $\Delta S$ by means of said deflector and thus obtained slit image of said first plane being projected in succession on a determined position in said second plane, wherein said slit width $\Delta S$ being selected to satisfy a relation $\Delta S < 1/Rp$ in which $Rp$ represents a determined resolving power of the image on said second plane, and wherein said first or second imaging optical system comprising means for correcting the image magnification in the longitudinal direction of said slit. Hereinafter the term resolving power shall mean that of the image projected on said second plane.

The above-mentioned correcting means comprises at least two of the optical members constituting said imaging optical systems, wherein said at least two optical members being rendered displaceable in cooperation with the deflecting function of said deflector.

In the present invention said first imaging optical system can be composed either of a rotary-symmetric magnification correcting lens group (hereinafter called rotary-symmetric variable-magnification lens group) or of an anamorphic magnification correcting lens group (hereinafter called anamorphic variable-magnification lens group). Also the second imaging optical system can be composed of a rotary-symmetric variable-magnification lens group or an anamorphic variable-magnification lens group for correcting the imaging magnification. However, in case either of the optical systems is composed of an anamorphic variable-magnification lens group, the other optical system has a be composed of a rotary-symmetric lens group.

The projection apparatus of the present invention is effective for use in a reading optical system utilizing a one-dimensional sensor array. For example the function of the slit can be achieved by a sensor array itself positioned on said second plane and having a dimension in the transversal direction (perpendicular to the longitudinal direction of said sensor array) smaller than $1/Rp$. In this manner it is rendered possible to read the image on the scanned plane without distortion by compensating the change in the projection magnification in the sensor array direction by means of the change in the imaging magnification of the projection optical system provided between the first scanned plane and said sensor array.

Also the projection apparatus of the present invention is applicable to a case in which a light source is provided at the second plane to perform signal recording on the first plane. In this case the effective diameter of the beam for recording on the first plane should be smaller than the above-mentioned value 1/Rp.

In the projection apparatus of the present invention a compact structure of the optical system is rendered possible by the above-mentioned tandem composition of two optical systems provided on both sides of the deflector. Also the use of such optical systems allows to reduce the amount of lens displacements required for compensating the change in the imaging magnification, thus enabling to realize a compact optical systems.

DESCRIPTION OF THE PREFERRED EMBODIMENTS

At first there will be given an explanation, while making reference to FIGS. 1 and 2, on the behavior of the imaging magnification in the scanning direction of the rotary mirror and in the perpendicular direction in case of projecting the image of the scanned plane by means of the projection apparatus shown in FIG. 1.

Figure 1:
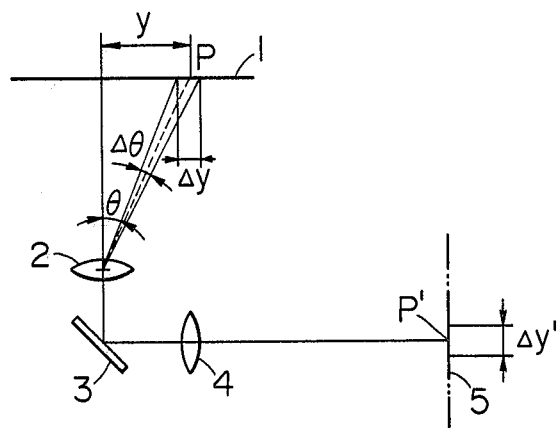
FIGS. 1 and 2 are schematic views of examples of the conventional projection apparatus.

As shown in FIG. 1, at point P conjugate to a fixed point P' on the focal plane 5 of the second imaging optical system 4 is present on the focal plane 1 of the first imaging optical system 2 and displaces along with the rotation of the rotary mirror 3. Between the angle $\theta$ of a ray entering from the point P into the front principal point of the imaging optical system 2 to the optical axis thereof and the distance y from the point P to the optical axis of the first imaging optical system 2 on said focal plane 1 there stands the following relation:

$$y = f_2 \tan \theta \qquad (1)$$

wherein $f_2$ is the focal length of said first imaging optical system 2. Thus, for an angle $\Delta\theta$ formed by two rays both entering the front principal point of the optical system 2 from both ends of a light of a small length $\Delta y$ lying in the scanning direction, there can be derived from the foregoing equation (1):

$$\Delta\theta = \Delta y/f_2 \times \cos^2\theta \qquad (2)$$

These two rays pass through the first imaging optical system 2, and, after reflection by the mirror 3, enter the second imaging optical system 4 still with the same angle $\Delta\theta$.

Now assuming for the purpose of simplicity that the point P' is present at the focal point of the second imaging optical system 4, and since the rotary mirror 3 is rotated so as to fix the position of the point P' which is conjugate to the position of the point P, the length $\Delta y'$ of the image on said focal plane 5 conjugate to said small line including the point P can be represented by the following equation:

$$\Delta y' = f_4 \times \Delta\theta \qquad (3)$$

wherein $f_4$ is the focal length of the second imaging optical system f. From the equations (2) and (3) there can be obtained:

$$\Delta y'/\Delta y = f_4/f_2 \times \cos^2\theta \qquad (4)$$

This equation indicates that the imaging magnification in the scanning direction around the point P changes along with the displacement of said point P on the focal plane 1 in the scanning function.

Figure 2:
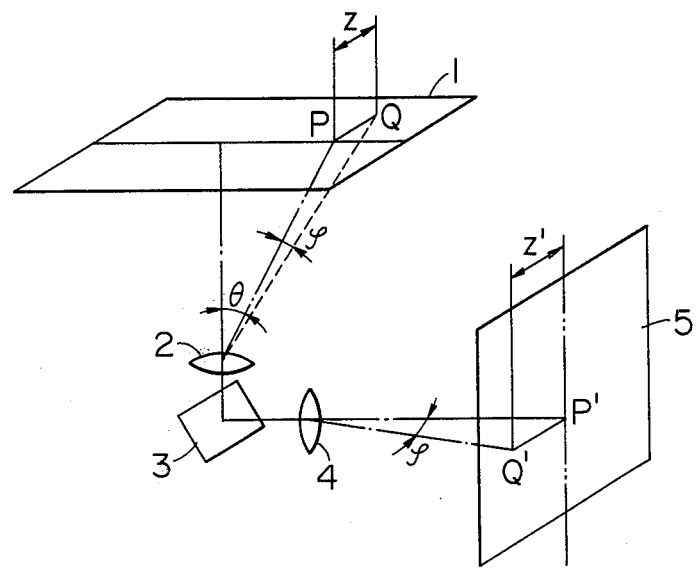

On the other hand, with respect to a direction perpendicular to the scanning direction, a point Q distanced from the point P by a distance Z as shown in FIG. 2 is rendered conjugate, through the rotary mirror 3 and the first and second imaging optical systems 2, 4, to a point Q' on the focal plane 5 and distanced from the point P' by a distance Z'. Since the angle $\theta$ formed by the rays entering the front principal point of the first imaging optical system from the points P and Q is equal to the angle of the corresponding rays emerging from the second imaging optical system 4 after reflection by the rotary mirror 3, there can be obtained:

$$Z = y \cdot \tan\phi/\sin\theta = f_2 \cdot \tan\phi/\cos\theta \qquad (5)$$
$$Z' = f_4 \cdot \tan\phi$$
$$\therefore Z'/Z = f_4/f_2 \cos\theta$$

Thus the imaging magnification in a direction perpendicular to the scanning direction also changes along with the change of the scanning position. In summary the imaging magnification in the scanning direction changes in proportion to $\cos^2\theta$ while that in the perpendicular direction change in proportion to $\cos\theta$.

The foregoing explanation is applicable to a case wherein the light beam is parallel between the first and second imaging optical systems, but in a more general condition wherein such parallel beam is not present, either of the first and second imaging optical systems is provided with variable focal length in such a manner that the imaging magnification $\beta 1$ of the first imaging optical system and that $\beta 2$ of the second system constantly provide a determined product $\beta 1 \cdot \beta 2$.

For example in case the imaging magnification $\beta 1$ of the first imaging optical system is constant, the focal length of the second imaging optical system is changed in response to the change in the object position of said second system, or in the focus position of the first system, caused by the rotation of the deflecting mirror, to maintain a constant imaging magnification $\beta 2$.

In the present invention, as already explained in the foregoing, there is employed a slit width $\Delta S$ satisfying the following condition:

$$\Delta S < 1/Rp$$

wherein Rp is the desired resolving power, in order to eliminate the effect of the change in the imaging magnification in the scanning direction. It is therefore necessary to correct the change in the imaging magnification in a direction perpendicular to the scanning direction, i.e. in the longitudinal direction of the slit. Since the slit width is sufficiently small, this correction can be made either in both directions by means of a rotary-symmetric variable-magnification lens group or in the perpendicular direction along by means of an anamorphic variable-magnification lens group.

Figure 3A:
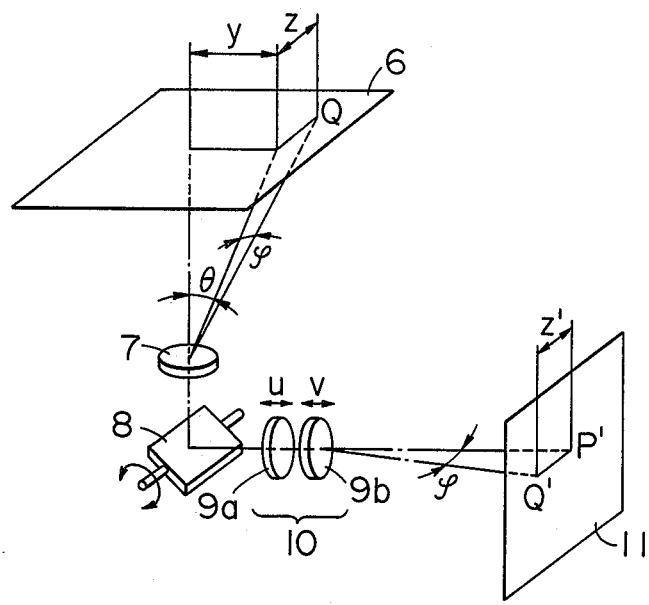
FIG. 3A is a perspective view of the projection apparatus embodying the present invention.

FIG. 3A shows, in a schematic perspective view, an embodiment of the projection apparatus of the present invention, wherein there is provided, between a deflector 8 and a flat fixed plane 6 to be scanned, a fixed lens group 7 of which one focal plane is positioned on said fixed plane 6, while between the deflector 8 and the imaging plane 11 there is provided a rotary-symmetric variable-magnification lens group 10 having one focal plane on said imaging plane 11. Said lens group 10 is adapted to change the imaging magnification without changing the position of the focal plane thereof, by the axial displacements of a first movable lens group 9a and a second movable lens group 9b constituting said lens group 10 in cooperation with the deflecting function of the deflector 8. An unrepresented slit may be provided in the vicinity of the imaging plane 11 to perform flying slit imaging scanning on the scanned plane 6, or may be positioned in the vicinity of said scanned plane 6 and displaced therealong in synchronization with the deflecting function of the deflector to achieve the slit scanning of said plane 6. In case said slit is positioned close to the imaging plane 11, it will be understood that the slit width is constant regardless of the magnification of the projection apparatus for projecting the image of the scanned plane 6 onto the imaging plane 11. Consequently, in order to obtain a resolving power for example of 8 lines per millimeter, the slit width can be selected at 0.125 mm or smaller. On the other hand, in case the slit is to be positioned close to the scanned plane 6, the effective slit width varies according to the magnification of the projection of scanned plane 6 onto the imaging plane 11. For example in order to obtain a resolving power of 8 lines per millimeter, the slit width can be selected as 0.125 mm for a projecting magnification of unity but becomes larger or smaller respectively when the projecting magnification is smaller or larger than unity. More precisely speaking the optically conjugate relationship stands between the scanned plane 6 and the imaging plane 11, but the desired resolving power is obtainable with the above-mentioned slit width since it is positioned very close to said scanned plane 6 or the imaging plane 11.

In the projection apparatus shown in FIG. 3A, alternatively there may be employed a rotary-symmetric variable-magnification lens group at 7 and a fixed lens system at 10. Also said rotary-symmetric variable-magnification lens group may be replaced by an anamorphic variable-magnification lens group for correcting the imaging magnification in the longitudinal direction of the slit alone.

In the following given are the numerical data for an embodiment composed, as shown in FIG. 3A, of the fixed rotary-symmetric lens group 7 and the rotary-symmetric variable-magnification lens group 10, with a projecting magnification of unity.

| Lens | Power (1/f) | Principal point distance |
|------|-------------|--------------------------|
| 7    | 0.00285714  | 70                       |
| 9a   | −0.004      | 40                       |
| 9b   | 0.00591133  |                          |

Figure 3B:
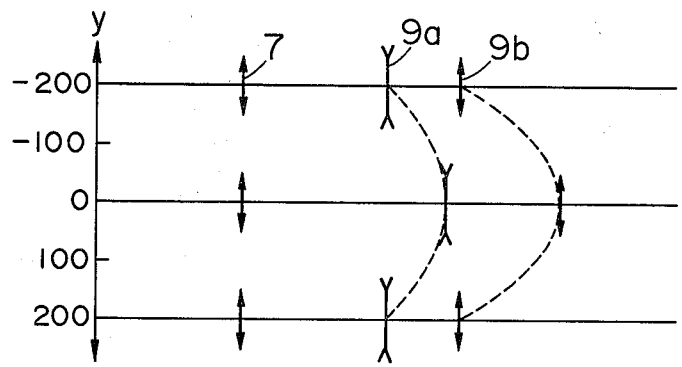
FIG. 3B is a chart showing the displacing trajectories of the projection lens system for use in the projection apparatus shown in FIG. 3A.

The distance from the scanned plane 6 to the principal point of the lens group 7 is equal to the focal length 350 mm of said lens group 7. The displacing amounts u and v of the lens groups 9a, 9b and the variation of magnification are summarized in Tab. 1, while the movements of said lens groups 9a, 9b are graphically shown in FIG. 3B.

TABLE 1

| y(mm) | δ(degree) | θ(degree) | u(mm) | v(mm) | β | bf |
|-------|-----------|-----------|-------|-------|------|---------|
| −200 | −14.872 | −29.744 | −20.019 | −35.940 | −1.152 | 441.941 |
| −150 | −11.599 | −23.198 | −11.063 | −20.834 | −1.088 | 426.834 |
| −100 | −7.973  | −15.946 | −4.828  | −9.447  | −1.040 | 415.478 |
| −50  | −4.065  | −8.130  | −1.190  | −2.404  | −1.010 | 408.405 |
| 0    | 0.      | 0.      | 0.      | 0.      | −1.0   | 406.001 |
| 50   | 4.065   | 8.130   | 1.190   | 2.404   | −1.010 | 408.405 |
| 100  | 7.973   | 15.946  | 4.828   | 9.477   | −1.040 | 415.478 |
| 150  | 11.599  | 23.198  | 11.063  | 20.834  | −1.088 | 426.834 |
| 200  | 14.872  | 29.744  | 20.019  | 35.940  | −1.152 | 441.941 | wherein
y: scanning distance on the scanned plane
δ: rotation angle of deflector (rotary mirror)
θ: deflection angle
β: imaging magnification of projection lens system
bf: back focus distance of projection lens system.

As will be seen from Tab. 1, the imaging magnification of the projection lens system varies from -31 1.0 to −1.152 in order to maintain a constant projection magnification of unity.

Figure 4A:
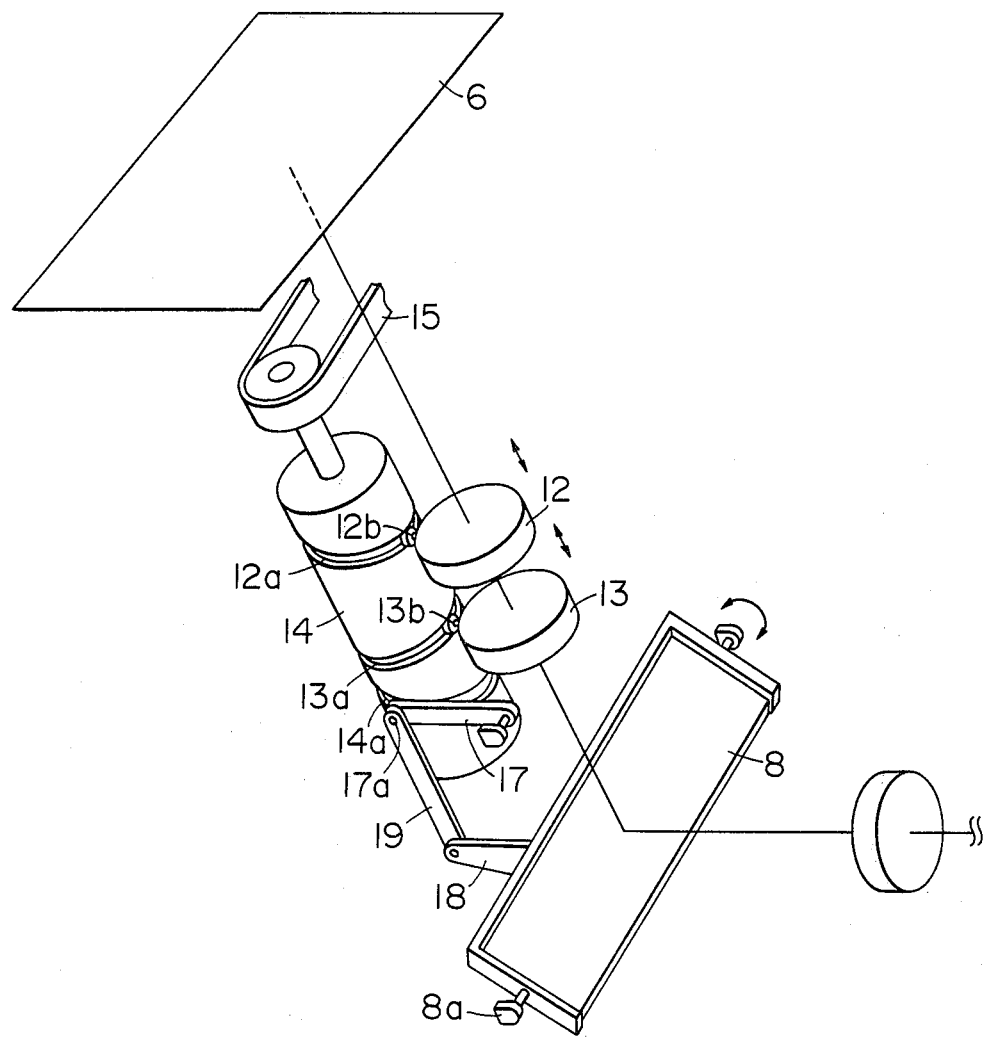
FIGS. 4A and 4B are views of an example of drive mechanism for the lens and deflector of the projection apparatus of the present invention.
Figure 4B:
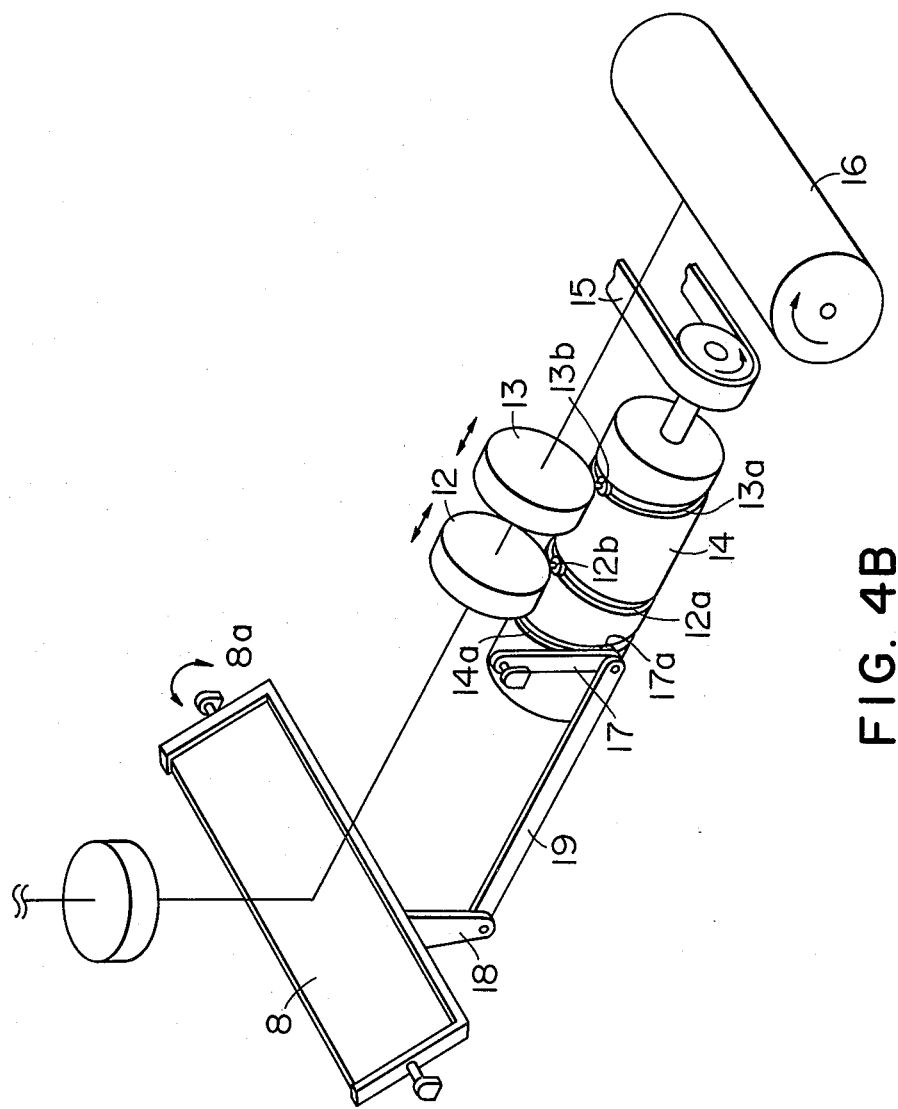

FIGS. 4A and 4B show an embodiment of the drive mechanism for the movable lens groups for compensating the imaging magnification in the apparatus of the present invention, wherein FIG. 4A representing a case of utilizing movable lenses 12, 13 in the lens group 7 between the scanned plane 6 and the deflector 8, while FIG. 4B representing a case of utilizing movable lenses 12, 13 in the lens group 10 positioned between the deflector 8 and the imaging plane 11. In these figures, a rotary mirror 8 constituting the deflector is pivotably supported by a shaft 8a, and said movable lenses 12, 13 are respectively supported, by unrepresented means, so as to be axially displaceable. Under said movable lenses there is provided a cylindrical cam 14 which is parallel to the optical axis and is maintained in constant rotation for example by a belt 15 in synchronization with a photosensitive member 16. Said cylindrical is provided with three cam grooves 12a, 13a and 14a in which respectively fitted are a cam follower 12b linked with the movable lens 12, a cam follower 13b linked with the movable lens 13 and a cam follower 14b provided on an end of a pivotably supported arm 17, which is connected, through a link member 19, to an arm 18 linked with the rotating mirror 8. In this manner the rotation of the cylindrical cam 14 causes the axial displacement of the lenses 12, 13 and the pivoting motion of the rotary mirror 8 around a shaft 8a corresponding to the form of said cam grooves.

Figure 5:
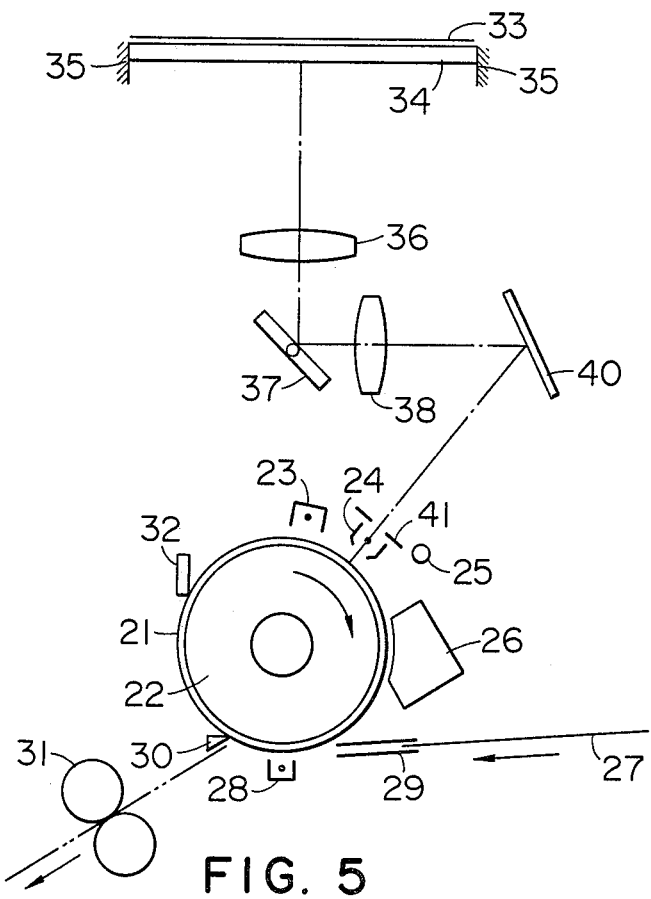
FIGS. 5 and 6 are views of examples in which the projection apparatus of the present invention is applied.

FIG. 5 shows, in a schematic view, an embodiment of a copier in which the projection apparatus of the present invention is applied. Referring to FIG. 5, a drum 22 provided on the periphery thereof with a photosensitive member 21 of three-layered structure composed of a photoconductive or insulating substrate, a photoconductive layer and an insulating layer in succession is supported in a determined position in the copier and is maintained in rotation in the direction of arrow by an unrepresented motor, wherein the speed of said rotation being selected constant regardless of the copying magnification. Said photosensitive member 21 is at first subjected to uniform charging by a DC corona discharger 23, then subjected to slit exposure of a light image of an original by an optical system to be explained later combined with simultaneous corona charging by an AC corona discharger or a DC corona discharger 24 of a polarity opposite to that of the DC corona discharger 23, said corona discharger 24 being provided with an aperture for allowing the passage of the imaging beam, and uniformly illuminated by a lamp 25 to form an electrostatic latent image of an elevated contrast. Said latent image is rendered visible by supporting a toner material to the photosensitive member 21 from a developing unit 26 for example of magnet brush type. The obtained visible toner image is transferred onto a transfer sheet 27 advanced at a same speed as the peripheral speed of the drum 22, said sheet receiving simultaneously on the rear side thereof a discharge, of a polarity opposite to that of the toner, from a corona discharger 28 for improving the efficiency of image transfer. Said transfer sheet is supplied one by one from an unrepresented cassette in synchronization with the rotation of the drum, then brought into contact with said photosensitive member 21 through a guide 29, and separated from said photosensitive member by a claw 30. The mechanism for the transfer sheet supply is already known. The toner image supported on said transfer sheet 27 is fixed in a fixing unit 31 for example of a heat roller type. On the other hand the toner remaining on the surface of the photosensitive member 21 after the image transfer is removed by a cleaning unit 32 for example composed of a rubber blade maintained in contact with said photosensitive member, whereby thus cleaned photosensitive member 21 being utilized again the succeeding imaging cycle.

An original 33 for copying is placed on a flat transparent original carriage plate 34, which is fixed to a fixed member 35 such as the side plate of the copier body. 36 is a first fixed imaging lens system having a focal plane coinciding with the surface of said original carriage 34, 37 is a rotary mirror, and 38 is a rotary-symmetric vjariable-magnification lens group having a focal plane at the surface of said photosensitive member 21 and also having an imaging magnification variable in synchronization with rotation of said mirror 37. 40 is a fixed mirror while 41 is a slit of a width $\Delta S$ satisfying the relation $\Delta S < 1/Rp$ for a desired resolving power $Rp$, whereby said original 33 being scanned by a slit width conjugate to said slit width through the above-explained optical system composed of the elements 40, 39, 38, 37 and 36. Consequently the slit image of the original 33 is focused on the rotary drum 22 without distortion, thus forming a distortion-free image of the original 33 by the rotation of said drum 22.

Figure 6:
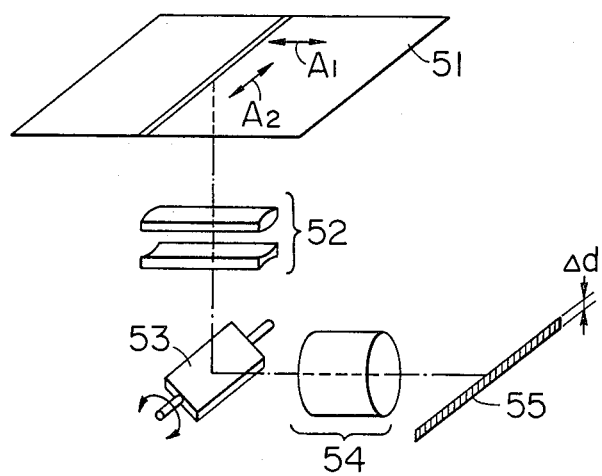

FIG. 6 shows, in a schematic perspective view, an embodiment of the reading optical system in which the projection apparatus of the present invention is applied. Referring to FIG. 6, 55 is a one-dimensional sensor array functioning also as the slit. Thus, in order to obtain a resolving power of 10 lines per millimeter on the copy of the same size as the original on the scanned plane 51, there is required a resolving power Rp of 50 lines per millimeter on said sensor array 55 for a projection lens system 52, 54 of a magnification of 1/5, so that the width $\Delta d$ of each photosensitive element in the sensor array should be equal to or smaller than 20 microns. 52 is an anamorphic variable-magnification lens group having a focal plane on the scanned plane 51 and provided for changing the imaging magnification in a direction A2 perpendicular to the slit scanning direction A1. 53 is a rotary polygonal mirror, and 54 is a fixed spherical lens group having a focal plane on said one-dimensional sensor array 55. The information received by said sensor array is utilized for the reproduction of the original image through an ink jet printer, laser beam printer or other information output device.

What we claim is:

1. A scanning projection apparatus for successively projecting, on light receiving means, an image of each portion of a first plane, comprising:
    a first imaging optical system having one focal plane on said first plane wherein said first optical system is for collimating a light beam from said first plane and having means for maintaining a constant image magnification of the image of each portion of said first plane projected on said light receiving means, in a direction perpendicular to the scanning direction of said first plane, while maintaining said one focal plane positioned on said first plane;
    a deflector for deflecting the light beam from said first imaging optical system to a predetermined direction;
    a second imaging optical system for receiving the light beam from said deflector and focusing the light beam on said light receiving means; and
    means for limiting the light beam focused on said light receiving means into a slit form elongated in a direction perpendicular to a scanning direction of said first plane, wherein the slit form has a slit width $\Delta S$ which satisfies a relation $\Delta S < 1/R_p$ for a predetermined resolving power $R_p$ on said light receiving means.

2. A scanning projection apparatus according to claim 1, wherein at least two of the optical elements constituting said first imaging optical system are movable along the optical axis in synchronism with the deflecting operation of said deflector, to thereby maintain the constant image magnification of the image of each portion of said first plane projected on said light receiving means.

3. A scanning projection apparatus according to claim 1 wherein said light receiving means comprises a sensor array of photosensitive elements, and said slit width $\Delta S$ is determined by the width, in a direction perpendicular to the array direction, of each photosensitive element constituting said sensor array.

4. A scanning projection apparatus for successively projecting on light receiving means, an image of each portion of a first plane comprising:
    a first imaging optical system having one focal plane on said first plane and being for collimating a light beam from said first plane;
    a deflector for deflecting the light beam from said first imaging optical system to a predetermined direction;
    a second imaging optical system for receiving the light beam from said deflector and focusing the light beam on said light receiving means, said second imaging optical system having means for maintaining a constant image magnification of the image of each portion of said first plane projected on said light receiving means, in a direction perpendicular to a scanning direction of said first plane, while maintaining one focal plane positioned on said light receiving means; and means for limiting the light beam focused on said light receiving means into a slit form elongated in a direction perpendicular to a scanning direction of said first plane, wherein the slit form has a slit width $\Delta S$ which satisfies a relation $\Delta S < 1/R_p$ for a predetermined resolving power $R_p$ on said light receiving means.

5. A scanning projection apparatus according to claim 4, wherein at least two optical elements constitute said second imaging optical system and are movable along the optical axis in synchronism with the deflecting operation of said deflector, to thereby maintain the constant image magnification of the image of each portion of said first plane projected on said light receiving means.

6. A scanning projection apparatus according to claim 4, wherein said light receiving means comprises a sensor array of photosensitive elements, and said slit width $\Delta S$ is determined by the width, in a direction perpendicular to the array direction, of each photosensitive element constituting said sensor array.

7. A slit scanning copier wherein slit images of an original are successively projected on a photosensitive drum, comprising:
   a fixed flat original supporting plate;
   a first imaging lens system having one focal plane on a plane of said original and being for collimating a light beam from said original;
   a deflector for deflecting the collimated beam from said first imaging lens system;
   a second imaging lens system for focusing the light beam, deflected by said deflector, on said photosensitive drum, said second imaging lens system having means for maintaining a constant imaging magnification of the image of said original focused onto said photosensitive drum, in a direction perpendicular to a scanning direction; and
   a slit disposed between said original and said photosensitive drum, the width $\Delta S$ of said slit satisfying relation $\Delta S < 1/R_p$ for a predetermined resolving power $R_p$ on said photosensitive drum.

8. A slit scanning copier according to claim 7, wherein at least two lens groups constituting said second imaging lens system are movable along the optical axis in synchronism with the deflecting operation of said deflector.

9. A slit scanning copier wherein slit images of an original are successively projected on a photosensitive drum, comprising:
   a fixed flat original supporting plate;
   a first imaging lens system having one focal plane on a plane of said original and being for collimating a light beam from said original, said first imaging lens system having means for maintaining a constant imaging magnification of the image of said original focused onto said photosensitive drum, in a direction perpendicular to a scanning direction;
   a deflector for deflecting the collimated beam from said first imaging lens system;
   a second imaging lens system for focusing the light beam, deflected by said deflector, on said photosensitive drum; and
   a slit disposed between said original and said photosensitive drum, the width $\Delta S$ of said slit satisfying relation $\Delta S < 1/R_p$ for a predetermined resolving power $R_p$ on said photosensitive drum.

10. A slit scanning copier according to claim 9, wherein at least two lens groups constituting said second imaging lens system are movable along the optical axis in sychronism with the deflecting operation of said deflector.

* * * * *